(12) United States Patent
Miyazaki (10) Patent No.: US 7,638,965 B2
(45) Date of Patent: Dec. 29, 2009

(54) MOTOR CONTROL APPARATUS (75) Inventor: Tomohiro Miyazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 522 days.

(21) Appl. No.: 11/596,007

(22) PCT Filed: Feb. 24, 2006

(86) PCT No.: PCT/JP2006/303463

§ 371 (c)(1),
(2), (4) Date: Nov. 9, 2006

(87) PCT Pub. No.: WO2007/096993

PCT Pub. Date: Aug. 30, 2007

(65) Prior Publication Data

US 2009/0251093 A1    Oct. 8, 2009

(51) Int. Cl.
*G05B 11/01* (2006.01)
(52) U.S. Cl. .................. 318/560; 318/568.17; 318/632; 318/721
(58) Field of Classification Search .................. 318/560, 318/568.17, 400.14, 400.16, 632, 721, 807
See application file for complete search history.

(56) References Cited

U.S. PATENT DOCUMENTS

| 5,589,748 | A  | * | 12/1996 | Kazama et al. | 318/560 |
| 6,219,196 | B1 | * | 4/2001 | Semba et al. | 360/75 |
| 6,274,994 | B2 | * | 8/2001 | Tsutsui | 318/560 |
| 6,534,944 | B2 | * | 3/2003 | Toyozawa et al. | 318/625 |
| 6,590,358 | B1 | * | 7/2003 | Tsutsui | 318/560 |
| 6,744,233 | B1 | * | 6/2004 | Tsutsui | 318/560 |
| 6,943,522 | B2 | * | 9/2005 | Nagaoka et al. | 318/632 |
| 6,949,905 | B2 | * | 9/2005 | Tomatsuri et al. | 318/567 |
| 6,963,184 | B2 | * | 11/2005 | Carlson | 318/460 |
| 7,016,142 | B2 | * | 3/2006 | Jung et al. | 360/77.02 |
| 7,026,779 | B2 | * | 4/2006 | Eba | 318/609 |
| 7,030,585 | B2 | * | 4/2006 | Iwashita et al. | 318/567 |
| 7,068,923 | B2 | * | 6/2006 | Miyazaki | 388/806 |
| 2005/0238335 | A1 |  | 10/2005 | Miyazaki | |

FOREIGN PATENT DOCUMENTS

| DE | 10297711 T5 | 4/2005 |
| JP | 5-76192 A | 3/1993 |
| JP | 2002-116803 A | 4/2002 |
| JP | 2005-63362 A | 3/2005 |
| JP | 2005-245051 A | 9/2005 |
| TW | 247478 B | 1/2006 |
| TW | 247479 B | 1/2006 |

\* cited by examiner

*Primary Examiner*—Bentsu Ro
*Assistant Examiner*—Antony M Paul
(74) *Attorney, Agent, or Firm*—Sughrue Mion, PLLC (57) ABSTRACT

A velocity control loop of a motor control apparatus including a notch filter. The notch filter attenuates a signal component at a central frequency from a motor driving command, and outputs the attenuated motor driving command. The driving of a motor is controlled based on the attenuated motor driving command. The central frequency of the notch filter is set equal to a frequency at which a phase of open loop frequency characteristics of the velocity control loop that does not include a notch filter is a value obtained by subtracting 180 degrees from a preset phase margin. An attenuation factor of the notch filter by which the signal component at the central frequency is attenuated is set so that a gradient of a phase diagram of the open loop frequency characteristics of the velocity control loop including the notch filter is substantially zero.

4 Claims, 6 Drawing Sheets

FIG. 7 PRIOR ART

MOTOR CONTROL APPARATUS

TECHNICAL FIELD

The present invention generally relates to a motor control apparatus used for controlling a motor employed in industrial machines such as machine tools or robots. The present invention specifically relates to a technique for improving the control capability of a velocity control loop included in the motor control apparatus.

BACKGROUND ART

Figure 7:
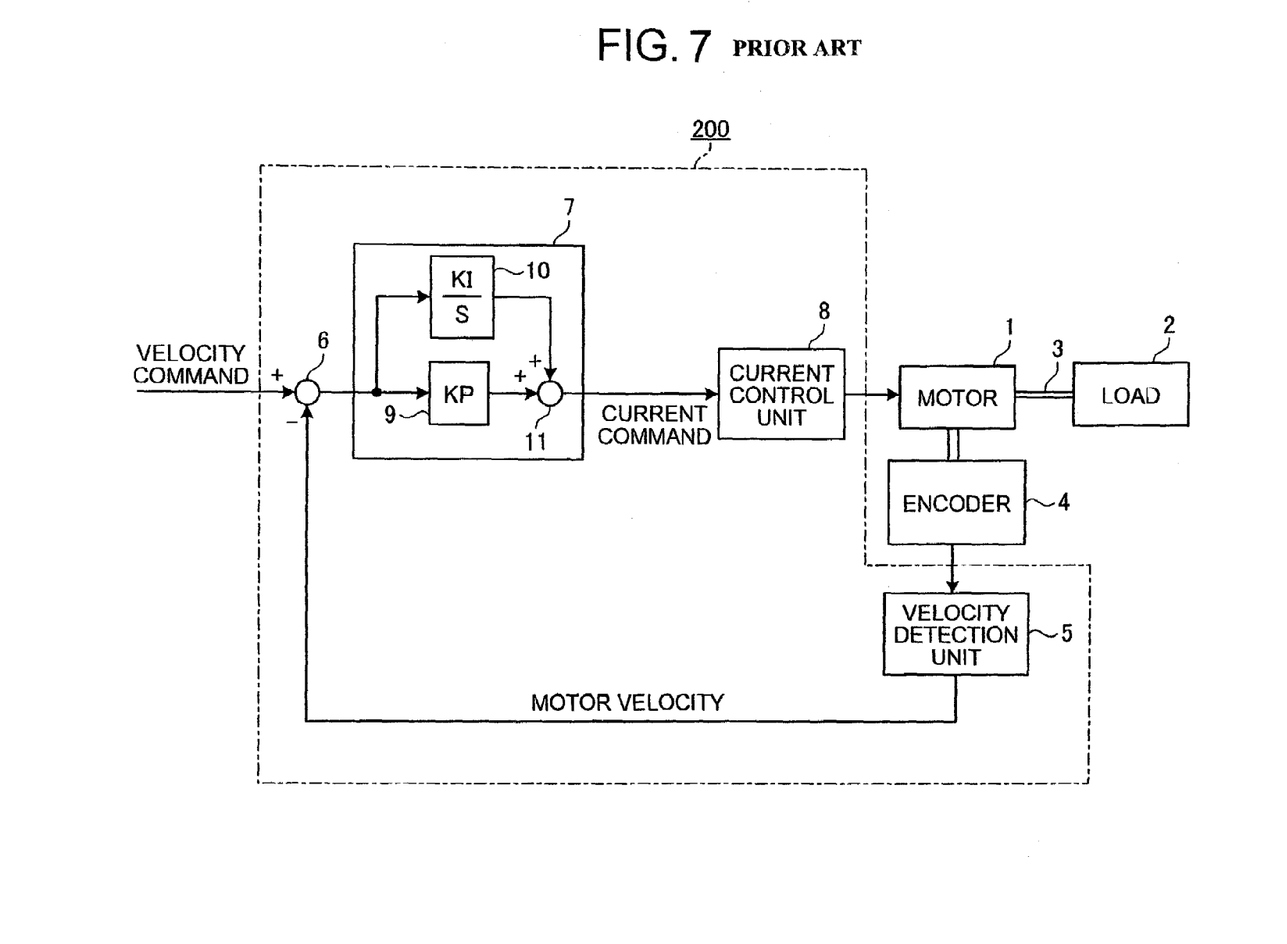
FIG. 7 is a block diagram of a velocity control system of a conventional motor control apparatus.

FIG. 7 is a block diagram of a velocity control system in a conventional motor control apparatus 200. The motor control apparatus 200 controls a motor 1. A load 2 is connected to a drive shaft 3 of the motor 1. An encoder 4 that detects a position of the motor 1 and that outputs the detected motor position is attached to the motor 1.

The motor control apparatus 200 includes a velocity detecting unit 5, a comparator 6, a velocity control unit 7, and a current control unit 8. The velocity detecting unit 5 calculates a differential of the motor position output from the encoder 4, and calculates a velocity (rotational velocity) of the motor 1 from the differential. The comparator 6 calculates a difference between a velocity command signal received from a higher-level controller or a position controller (not shown) with the motor velocity received from the velocity detecting unit 4, and outputs a velocity error indicative of the difference. The velocity control unit 7 receives the velocity error, calculates a current command that is a command to drive the motor 1 ("motor driving command"), and outputs the current command to the current control unit 8. The current control unit 8 controls the current to be supplied to the motor 1 based on the current command received from the velocity control unit 7. Due of the current supply to the motor 1, a predetermined torque is generated in the motor 1 and the motor 1 is driven.

The velocity control unit 7 includes a comparison controller 9, an integration controller 10, and an adder 11. The comparison controller 9 multiplies the input velocity error by a comparison gain KP, and outputs the result of the multiplication. The integration controller 10 multiplies an integrated value of the velocity error by an integration gain KI and outputs the result of the multiplication. The adder 11 adds the results received from the comparison controller 9 and the integration controller 10, and outputs the result of the addition as the current command.

The conventional motor control apparatus 200 provides a control to generate a torque in the motor 1 so that the velocity error, which is the difference between the velocity command signal and the motor velocity, is smaller. As a result, the motor 1 and the load 2 rotate to follow up the velocity command signal transmitted from the higher-level controller or the position controller. The motor velocity changes if a disturbance torque acts on the load 2. However, this velocity change is detected by the encoder 4 and the velocity detecting unit 5, the detected velocity change is fed back to the velocity control unit 7, and the velocity control unit 7 generates the current command to correct the change in the motor velocity due to the disturbance torque. In this manner, even if a disturbance torque acts on the load 2, because a change in the motor velocity is suppressed by a velocity control loop, the motor 1 can be controlled to always follow up the velocity command signal.

A velocity command signal follow-up speed, a velocity command signal follow-up accuracy, and a performance for suppressing an influence of the disturbance torque are improved if the comparison gain KP and the integration gain KI are higher. Owing to this, these gains are normally set as high as possible. However, if these gains are set too high, then the control system can become instable, and vibrations and oscillations can occur. Therefore, there is a trend to set these gains as high as possible and within a range within which stability margins can be secured.

Phase margin and gain margin are known indexes of the stability margin. There is known a technique for adjusting control parameters such as the comparison gain KP and the integration gain KI in such a manner that the phase margin and the gain margin fall within their respective ranges (see for example, Patent Document 1).

However, in the conventional technique, if the stability margins such as the phase margin and the gain margin are insufficient, the comparison gain KP and the integration gain KI are simply set lower. Due to this, the comparison gain KP and the integration gain KI often cannot be set sufficiently high. As a result, the required control performance cannot be obtained.

Furthermore, Patent Document 2 proposes an improvement in a control capability of the motor control apparatus by providing a notch filter in the motor control apparatus. In this technique, a frequency near an oscillating frequency of the control system or a frequency at which a phase delay begins to appear is set as a central frequency. In addition, a notch filter, which has a small attenuation at the central frequency, is inserted into the control system, thereby improving a phase characteristic of the control system. If the phase characteristic is improved, the control gain can be increased while preventing oscillations. The control performance can be, therefore, improved.

In this technique, however, a degree of improving the phase characteristic of the control system depends largely on characteristics of the notch filter. To improve the phase characteristic, it is necessary to appropriately set the central frequency of the notch filter and the attenuation at the central frequency of the notch filter. However, no document, including the Patent Document 2, teaches how to set the central frequency and the attenuation at the central frequency of the notch filter. Therefore, it is difficult to set the characteristics of the notch filter for different control targets. As a result, a characteristics improving effect by providing the notch filter cannot be attained sufficiently.

Patent Document 1: Japanese Patent Application Laid-open No. 2002-116803

Patent Document 2: Japanese Patent Application Laid-open No. H5-76192

DISCLOSURE OF INVENTION

Problem to be Solved by the Invention

According to the conventional technique for adjusting the control parameters so that the phase margin and the gain margin fall within their respective predetermined ranges as disclosed in the Patent Document 1, the comparison gain KP and the integration gain KI cannot often be set sufficiently high. It is, therefore, often impossible to satisfy the required control performance.

According to the technique proposed in the Patent Document 2, it is often impossible to sufficiently improve the characteristics of the control system since the method for appropriately setting the characteristics of the notch filter is unknown.

The present invention has been achieved to solve these problems. It is an object of the present invention to provide a motor control apparatus that can effectively improve a performance of a control system while securing a predetermined phase margin and a predetermined gain margin.

Means for Solving Problem

According to an aspect of the present invention, a motor control apparatus includes a velocity control loop. The velocity control loop includes a velocity detecting unit that detects a motor velocity; a velocity control unit that inputs the motor velocity detected by the velocity detecting unit and a velocity command signal, and that outputs a motor driving command so as to cause the motor velocity to follow up the velocity command signal; and a notch filter that is connected to the velocity control unit in series, that attenuates a signal component at a predetermined central frequency from an input signal, and that outputs the attenuated input signal. The central frequency of the notch filter is set equal to a frequency at which a phase of open loop frequency characteristics of the velocity control loop that does not include the notch filter is a value obtained by subtracting 180 degrees from a preset phase margin, and an attenuation factor of the notch filter by which the signal component at the central frequency is attenuated is set so that a gradient of a phase diagram of the open loop frequency characteristics of the velocity control loop including the notch filter is substantially zero at the central frequency.

According to another aspect of the present invention, a motor control apparatus includes a velocity control loop. The velocity control loop includes a velocity detecting unit that detects a motor velocity; a velocity control unit that inputs the motor velocity detected by the velocity detecting unit and a velocity command signal, and that outputs a motor driving command to cause the motor velocity to follow up the velocity command signal; and a notch filter that is connected to the velocity control unit in series, that attenuates a signal component at a predetermined central frequency from an input signal, and that outputs the attenuated input signal. The central frequency of the notch filter is set equal to a frequency at which a phase of open loop frequency characteristics of the velocity control loop that does not include the notch filter is a value obtained by subtracting 180 degrees from a preset phase margin, and an attenuation factor of the notch filter by which the signal component at the central frequency is attenuated is −3 decibels to −6 decibels.

According to still another aspect of the present invention, a motor control apparatus includes a velocity control loop. The velocity control loop includes a velocity detecting unit that detects a motor velocity; a velocity control unit that inputs the motor velocity detected by the velocity detecting unit and a velocity command signal, and that outputs a motor driving command to cause the motor velocity to follow up the velocity command signal; and a notch filter that is connected to the velocity control unit in series, that attenuates a signal component at a predetermined central frequency from an input signal, and that outputs the attenuated input signal. The central frequency of the notch filter is 0.3 to 0.7 times as high as a frequency at which a phase of open loop frequency characteristics of the velocity control loop that does not include the notch filter is −180 degrees, and an attenuation factor of the notch filter by which the signal component at the central frequency is attenuated is −3 decibels to −6 decibels.

According to still another aspect of the present invention, a motor control apparatus includes a velocity control loop. The velocity control loop includes a velocity detecting unit that detects a motor velocity; a velocity control unit that inputs the motor velocity detected by the velocity detecting unit and a velocity command signal, and that outputs a motor driving command to cause the motor velocity to follow up the velocity command signal; and a notch filter that is connected to the velocity control unit in series, that attenuates a signal component at a predetermined central frequency from an input signal, and that outputs the attenuated input signal. The motor control apparatus further includes a phase-margin setting unit that sets a desired phase margin; a gain-margin setting unit that sets a desired gain margin; a frequency-characteristic acquiring unit that acquires open loop frequency characteristics of the velocity control loop that does not include the notch filter; and a parameter setting unit that sets the central frequency of the notch filter and an attenuation factor of the notch filter by which a signal component at the central frequency is attenuated. The parameter setting unit sets the central frequency of the notch filter and the attenuation factor of the notch filter by which the signal component at the central frequency is attenuated to satisfy the phase margin set by the phase-margin setting unit and the gain margin set by the gain-margin setting unit, and so that a control gain of the velocity control unit is highest within a range within which the attenuation factor of the notch filter by which the signal component at the central frequency is attenuated is equal to or higher than −6 decibels, based on the velocity open loop frequency characteristics obtained by the frequency-characteristic acquiring unit.

Effect of the Invention

In the motor control apparatus according to the present invention, the central frequency of the notch filter is set equal to the frequency at which the phase of open loop frequency characteristics of the velocity control loop that does not include the notch filter is a value obtained by subtracting 180 degrees from the preset phase margin, and the attenuation factor of the notch filter by which the signal component at the central frequency is attenuated is set so that the gradient of the phase diagram of the open loop frequency characteristics of the velocity control loop including the notch filter is substantially zero at the central frequency. Therefore, it is possible to increase the gain margin while securing the desired phase margin. This can thereby increase the control gain and improve the control performance while securing the desired phase margin and the desired gain margin.

In the motor control apparatus according to the present invention, the central frequency of the notch filter is set equal to the frequency at which the phase of open loop frequency characteristics of the velocity control loop that does not include the notch filter is the value obtained by subtracting 180 degrees from the preset phase margin, and the attenuation factor of the notch filter by which the signal component at the central frequency is attenuated is −3 decibels to −6 decibels. Therefore, it is possible to increase the gain margin while securing the desired phase margin. This can thereby increase the control gain and improve the control performance while securing the desired phase margin and the desired gain margin.

In the motor control apparatus according to the present invention, the central frequency of the notch filter is 0.3 to 0.7 times as high as a frequency at which the phase of open loop frequency characteristics of the velocity control loop that does not include the notch filter is −180 degrees, and the attenuation factor of the notch filter by which the signal component at the central frequency is attenuated is −3 decibels to −6 decibels. Therefore, it is possible to increase the gain margin while securing the desired phase margin. This can thereby increase the control gain and improve the control performance while securing the desired phase margin and the desired gain margin.

In the motor control apparatus according to the present invention, the parameter setting unit sets the central frequency of the notch filter and the gain at the central frequency so that the control gain is the highest within a range within which the set phase margin and the set gain margin are satisfied, based on the velocity open loop frequency characteristics. Therefore, it is possible to increase the control gain and improve the control performance while securing the desired phase margin and the gain margin. In addition, since the gain at the central frequency of the notch filter is set equal to or higher than −6 decibels, a stable control can be realized without great phase delay at lower frequencies than the central frequency.

EXPLANATIONS OF LETTERS OR NUMERALS

1 Motor
2 Load
3 Driving shaft
4 Encoder
5 Velocity detecting unit
6 Comparator
7 Velocity control unit
8 Current control unit
9 Comparison controller
10 Integration controller
11 Adder
12 Notch filter
13 Phase margin setting unit
14 Gain margin setting unit
15 Parameter setting unit
16 Frequency characteristic acquiring unit
100, 110 Motor control apparatus

BEST MODE(S) FOR CARRYING OUT THE INVENTION

Exemplary embodiments of a motor control apparatus according to the present invention will be explained below in detail with reference to the accompanying drawings.

First Embodiment

Figure 1:
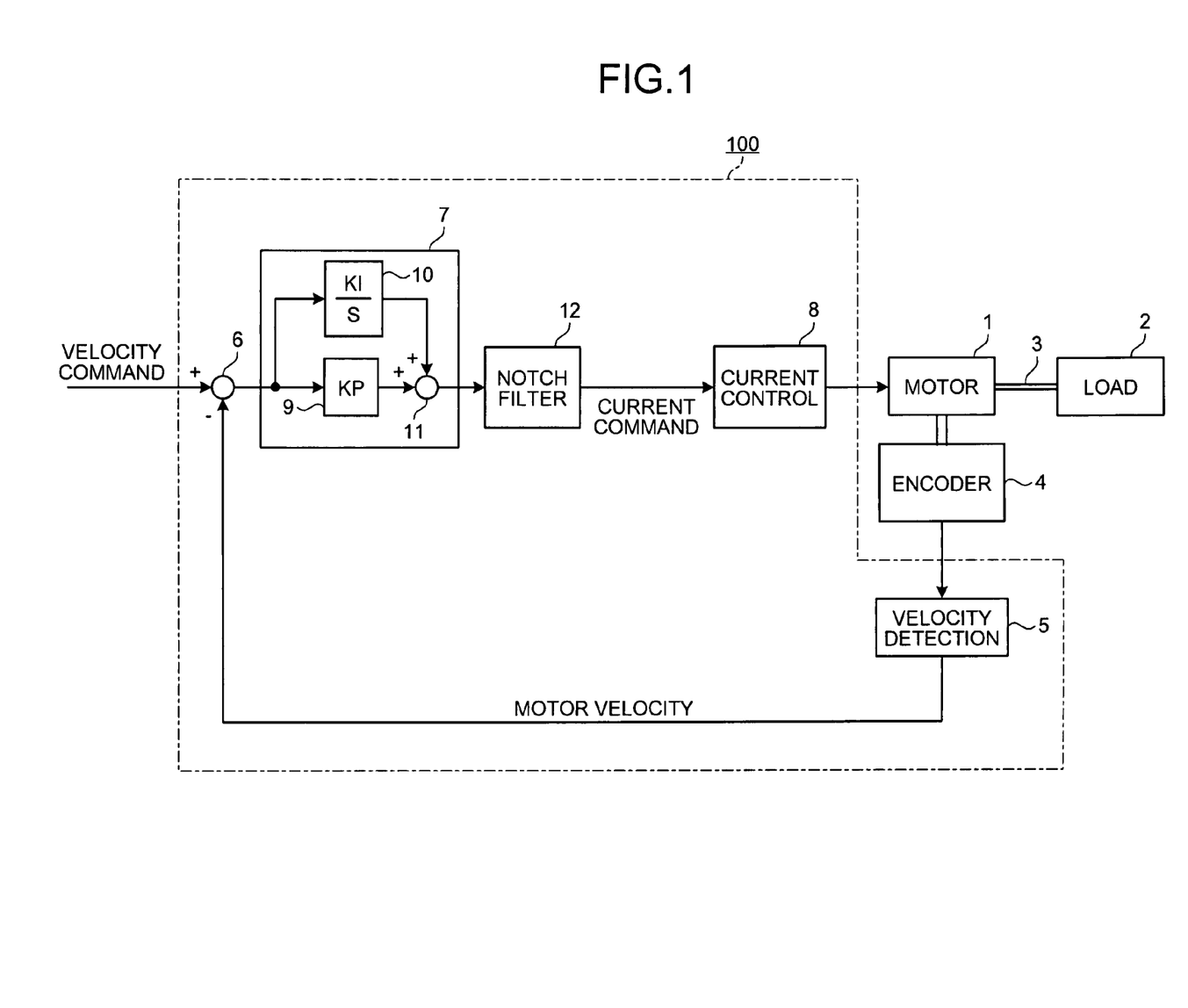
FIG. 1 is a block diagram of a motor control apparatus according to a first embodiment of the present invention.

FIG. 1 is a block diagram of a motor control apparatus 100 according to the first embodiment of the present invention.

The motor control apparatus 100 controls the motor 1. The load 2 is connected to the driving shaft 3 of the motor 1. The encoder 4 that detects a position of the motor 1 and that outputs the detected motor position is attached to the motor 1.

The motor control apparatus 100 includes a velocity detecting unit 5, a comparator 6, a velocity control unit 7, a notch filter 12, and a current control unit 8. The velocity detecting unit 5 calculates a differential of the motor position output from the encoder 4, and calculates a velocity (rotational velocity) of the motor 1 from the differential. The comparator 6 calculates a difference between a velocity command signal received from the higher-level controller or the position controller (not shown) with the motor velocity received from the velocity detecting unit 4, and outputs a velocity error that indicative of the difference. The velocity control unit 7 receives the velocity error, and calculates a current command that is a command to drive the motor 1. The notch filter 12 receives the motor driving command from the velocity control unit 7, attenuates a signal component at a predetermined central frequency from this motor driving command, and outputs the result of the attenuation. The current control unit 8 controls the current to be supplied to the motor 1 based on the current command received from the notch filter 12. Due to the current supply to the motor 1, a predetermined torque is generated in the motor 1 and the motor 1 is driven.

The velocity control unit 7 includes a comparison controller 9, an integration controller 10, and an adder 11. The comparison controller 9 multiplies the input velocity error by a comparison gain KP, and outputs the result of the multiplication. The integration controller 10 multiplies an integrated value of the velocity error by an integration gain KI and outputs the result of the multiplication. The adder 11 adds the results received from the comparison controller 9 and the integration controller 10 and outputs the result of the addition as the current command.

Figure 2:
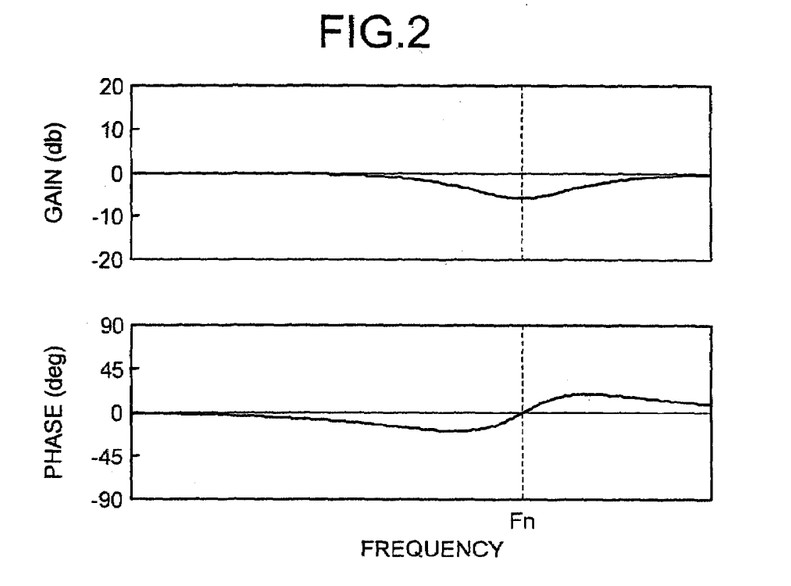
FIG. 2 depicts frequency characteristics of a notch filter according to the first embodiment.

The notch filter 12 according to this embodiment has frequency characteristics as shown in FIG. 2. In FIG. 2, the upper diagram depicts a gain characteristic and the lower diagram depicts a phase characteristic. FIG. 2 depicts the frequency characteristics when a gain (hereinafter, "attenuation factor") at a central frequency is −6 decibels. The gain of the notch filter 12 is the lowest at the central frequency, thus, the notch filter 12 attenuates a signal component in an input signal at this frequency, and outputs the attenuated input signal. The phase characteristics are such that a phase of a component in the input signal that has lower frequency than the central frequency Fn is delayed, and a phase of a component that has higher frequency than the central frequency Fn is advanced.

Figure 3:
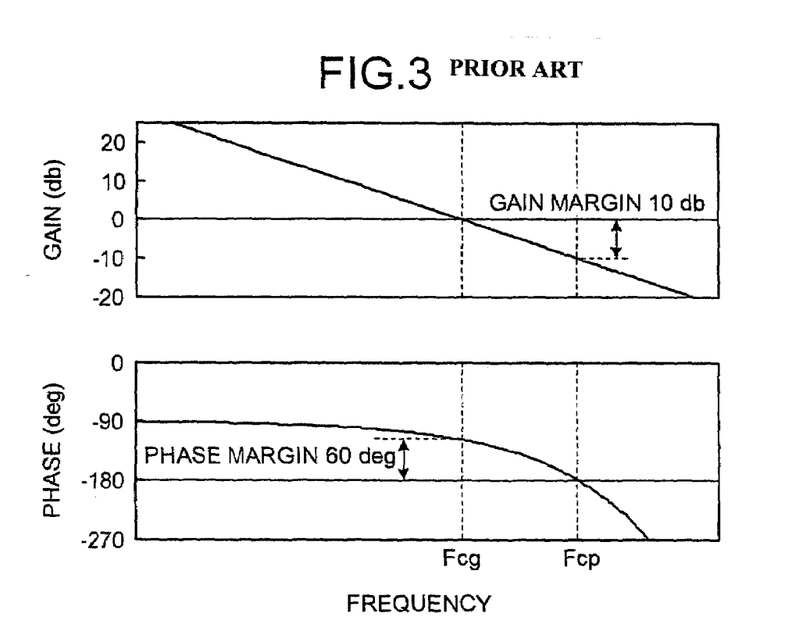
FIG. 3 depicts open loop frequency characteristics of a velocity control loop that does not include a notch filter.

FIG. 3 depicts open loop frequency characteristics (velocity open loop frequency characteristics) if the notch filter 12 is not provided, i.e., those of a velocity control loop of the conventional motor control apparatus as shown in FIG. 7. The velocity open loop frequency characteristics are frequency characteristics at a path from an input of the velocity control unit 7 until out of the motor velocity from the velocity detecting unit 5. In FIG. 3, the integration gain KI has not been taken into consideration because of its negligible value, i.e., KI is assumed to be 0 (KI=0). Moreover, it is assumed that a rigidity of the driving shaft 3 that connects the motor 1 to the load 2 is sufficiently high. With those assumptions, a gain characteristic of the velocity open loop can be represented by a line having a gradient of −20 db/dec. Moreover, a phase characteristic is −90 degrees at lower frequencies, phase delay increases at higher frequencies because of an operational delay in the velocity control unit 7 and a detection delay in the velocity detecting unit 5.

It is necessary to secure a certain phase margin and a certain gain margin to realize a stable control. The phase margin is a value obtained by adding 180 degrees to a phase at a frequency ("Fcg" in FIG. 3) at which the gain is 0 decibels. On the other hand, the gain margin is a value obtained by inverting a sign of the gain at a frequency ("Fcp" in FIG. 3) at which the phase is 180 degrees. According to FIG. 3, the phase margin is 60 degrees and the gain margin is 10 decibels. According to the Patent Document 1, the phase margin and the gain margin should be from 35 degrees to 80 degrees and from 10 decibels to 25 decibels, respectively. Patent Document 1 teaches to set the phase margin and the gain margin to 35 degrees and 10 decibels, respectively. If the teachings of Patent Document 1 are followed, because the gain margin is only 10 decibels in FIG. 3, the gain cannot be increased any more.

Figure 4:
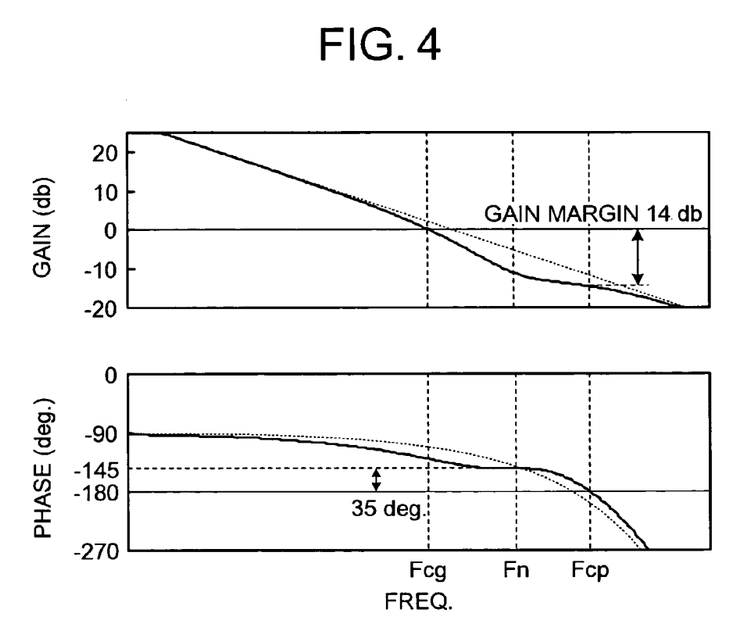
FIG. 4 depicts open loop frequency characteristics of a velocity control loop that includes a notch filter.

In FIG. 4, solid-line curves represent velocity open loop frequency characteristics when the notch filter 12 having the characteristics shown in FIG. 2 is provided in the motor control apparatus. The conventional frequency characteristics shown in FIG. 3 are indicated by dotted lines in FIG. 4 for easy comparison. The central frequency Fn of the notch filter 12 is set to a frequency at which a phase (indicated by the dotted line) of the velocity open loop frequency characteristics of the motor control apparatus that does not include the notch filter 12 is equal to a value obtained by subtracting 180 degrees from the phase margin of 35 degrees set above, i.e., −145 degrees. Moreover, the attenuation factor of the notch filter 12 is set so that a gradient of a phase diagram (indicated by the solid line) of the velocity open loop frequency characteristics of the motor control apparatus that includes the notch filter 12 is zero at the central frequency Fn.

By inserting the notch filter 12 into the velocity control loop, the gradient of the phase at the frequency at which the phase is −145 degrees (that is, at the central frequency Fn) becomes zero. In other words, the phases at frequencies around this frequency become substantially constant. Due to this, even if the gain is set higher and the frequency (Fcg) at which the gain is zero decibels is moved to a higher frequency side, then the phase margin hardly changes in this frequency range, while the phase margin that is set to 35 degrees is secured.

Further, by inserting the notch filter 12 into the velocity control loop, the frequency (Fcp) at which the phase is −180 moves to the higher frequency side so that the gain at the frequency Fcp becomes lower. Therefore, the gain margin is increased as compared with the motor control apparatus that does not include the notch filter. In FIG. 4, the gain margin is 14 decibels if the notch filter 12 is inserted, i.e., the gain margin is increased by 4 decibels as compared to the gain margin of the motor control apparatus that does not include the notch filter. This signifies that the velocity gain can be increased by 4 decibels.

By inserting the notch filter 12 into the velocity control loop, it is possible to increase the velocity gain while securing the phase margin that is set to 35 degrees, and improve the control characteristics.

In the first embodiment, the attenuation factor of the notch filter 12 is set so that the gradient of the phase is zero at the frequency at which the phase of the velocity open loop frequency characteristics is the value obtained by subtracting 180 degrees from the preset phase margin. Such an attenuation factor can be calculated based on the set phase margin and the frequency characteristic of a control target. According to the Patent Document 1, the phase margin should be from 35 degrees to 80 degrees. However, for a servo control such as a motor control, the phase margin is often set to about 35 degrees to 60 degrees to obtain high-speed follow-up characteristics. If the control target has a sufficiently high mechanical rigidity and frequency characteristics as shown in FIG. 3, the attenuation factor becomes −6 decibels if the phase margin is set to 35 degrees and becomes −3 decibels if the phase margin is set to 60 degrees. Thus, if the attenuation factor is set between −3 decibels and −6 decibels, present invention can be applied in various situations of motor control.

Furthermore, in the first embodiment, the central frequency Fn of the notch filter 12 is set to the frequency at which the phase of the velocity open loop frequency characteristics of the motor control apparatus that does not include the notch filter is equal to the value obtained by subtracting 180 degrees from the preset phase margin; however the central frequency can be calculated from the frequency (Fcp) at which the phase is −180 degrees. If the velocity open loop has the characteristics as shown in FIG. 3, and the phase margin is set to 35 degrees, the frequency at which the phase of the velocity open loop frequency characteristics is the value (−145 degrees) obtained by subtracting 180 degrees from the preset phase margin (35 degrees) is 0.6 times as high as the frequency Fcp. In addition, the central frequency is 0.33 times the frequency Fcp if the phase margin is set to 60 degrees. However, the central frequency need not be exactly to the above values, i.e., it is allowable to set the central frequency in a range that includes the above values, and the range does not lessen the effects of the present invention. Therefore, if the central frequency Fn is set to be about 0.3 to 0.7 times the frequency Fcp, present invention can be applied in various situations.

In the first embodiment, the notch filter 12 is interposed between the velocity control unit 7 and the current control unit 8. However, similar effects can be produced even if the notch filter 12 is interposed between the velocity detecting unit 5 and the comparator 6.

Second Embodiment

Figure 5:
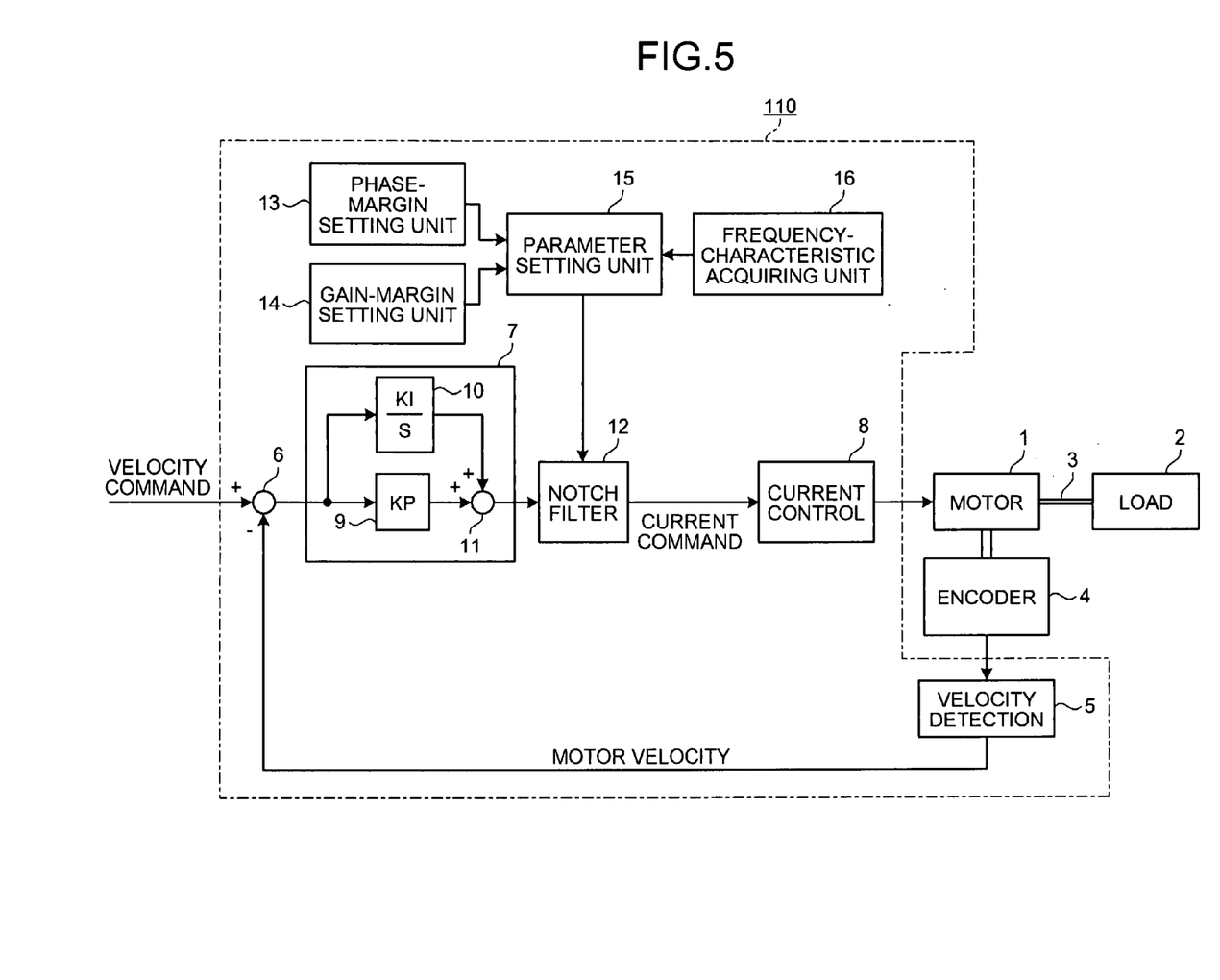
FIG. 5 is a block diagram of a motor control apparatus according to a second embodiment of the present invention.

FIG. 5 is a block diagram of a motor control apparatus 110 according to the second embodiment of the present invention. Like or corresponding constituent elements to those of the motor control apparatus 100 according to the first embodiment shown in FIG. 1 are denoted by the same reference letters or numerals, respectively, and will not be explained below. The motor control apparatus 110 includes a phase-margin setting unit 13, a gain-margin setting unit 14, a parameter setting unit 15, and a frequency-characteristic acquiring unit 16. The phase-margin setting unit 13 sets a desired phase margin, and the gain-margin setting unit 14 sets a desired gain margin. The parameter setting unit 15 sets a central frequency and an attenuation factor of the notch filter 12, and the frequency-characteristic acquiring unit 16 acquires open loop frequency characteristics of a velocity control loop that does not include a notch filter.

The frequency-characteristic acquiring unit 16 acquires the open loop frequency characteristics of the velocity control loop. Several methods are known for acquiring the frequency characteristics. The open loop frequency characteristics can be measured using a dedicated measuring instrument, or obtained by applying a random velocity command signal to drive the motor, and subjecting a velocity response at the time of driving to a frequency analysis. Alternatively, if a mass, a moment of inertia, a rigidity and the like of each of the motor 1 and the load 2 are known, the open loop frequency characteristics can be calculated by inserting those values in a mathematical model.

The parameter setting unit 15 sets the central frequency and the attenuation factor of the notch filter 12 so that the comparison gain KP of the velocity control unit 7 is the highest within a range within which the phase margin set by the phase-margin setting unit 13 and the gain margin set by the gain-margin setting unit 14 are satisfied, based on the velocity open loop frequency characteristics acquired by the frequency-characteristic acquiring unit 16. However, in any case the attenuation factor of the notch filter 12 is set to be equal to or higher than −6 decibels. The central frequency and the attenuation factor that satisfy these conditions can be calculated by solving a constrained nonlinear optimization problem. As a method for solving the constrained nonlinear optimization problem, many calculation algorithms such as a sequential quadratic programming or a genetic algorithm are known.

Figure 6:
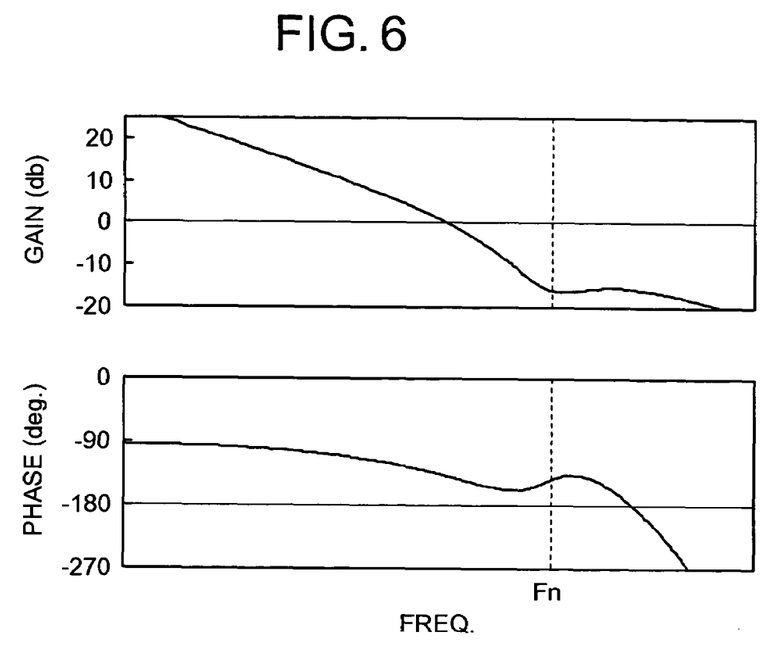
FIG. 6 depicts open loop frequency characteristics of the velocity control loop if an attenuation factor of the notch filter is set excessively low.

The parameter setting unit 15 set the attenuation factor of the notch filter 12 to be equal to or higher than −6 decibels for the following reasons. As shown in FIG. 2, the frequency characteristics of the notch filter 12 are such that the phase is delayed at lower frequencies than the central frequency Fn. This phase delay is greater if the attenuation factor is lower. Due to this, if the attenuation factor is set too low, the phase delay at the lower frequencies is greater, which adversely affects control characteristics. FIG. 6 depicts velocity open loop frequency characteristics if the attenuation factor of the notch filter 12 is set to −10 decibels, which is lower than −6 decibels. As obvious from FIG. 6, the phase is greatly delayed at several lower frequencies than the central frequency Fn of the notch filter 12. The phase delay at such low frequencies is not desirable for the control systems.

Namely, if the attenuation factor of the notch filter 12 is set lower than −6 decibels, the phase delay at the lower frequencies is greater. To avoid this, the attenuation factor of the notch filter 12 is set to be equal to or higher than −6 decibels.

In the second embodiment, the parameter setting unit 15 sets the central frequency Fn and the attenuation factor of the notch filter 12 by solving the constrained nonlinear optimization problem based on the velocity open loop frequency characteristics acquired by the frequency-characteristic acquiring unit 16, the phase margin set by the phase-margin setting unit 13, and the gain margin set by the gain-margin setting unit 14. Alternatively, the parameter setting unit 15 can be configured so that the nonlinear optimization problem is solved in advance, and the result is stored in a table or the like to be used when setting the central frequency Fn and the attenuation factor.

In this alternative, the parameter setting unit 15 can solve the nonlinear optimization problem for the control target having the characteristics as shown in FIG. 3 using various phase margins and gain margins, and can store the results in the table. When setting the values, the parameter setting unit 15 reads a central frequency and a attenuation factor from the table that correspond to the preset phase margin and the preset gain margin.

Alternatively, when storing the central frequency obtained by solving the nonlinear optimization problem in the table, the parameter setting unit 15 can normalize the central frequency to the frequency Fcp at which the phase of the velocity open loop frequency characteristics is −180 degrees, and store the normalized central frequency in the table. By doing so, an appropriate central frequency can be selected even if the Fcp is changed according to the control target.

Furthermore, the central frequency and the attenuation factor of the notch filter 12 obtained by solving the constrained nonlinear optimization problem can be stored not in the table but in the form of approximation equations.

In this manner, the parameter setting unit sets the central frequency and the attenuation factor of the notch filter so that the control gain is the highest in the range that satisfies the preset phase margin and the preset gain margin. It is, therefore, possible to increase the control gain while securing the desired phase margin and the desired gain margin, and improve the control performance. Besides, because the attenuation factor of the notch filter is set to be equal to or higher than −6 decibels, it is possible to realize a stable control without a great phase delay at lower frequencies.

INDUSTRIAL APPLICABILITY

The motor control apparatus according to the present invention is suitable as a motor control apparatus employed in an industrial machine such as a machine tool or a robot.

The invention claimed is:

1. A motor control apparatus that controls driving of a motor and includes a velocity control loop, wherein the velocity control loop includes a velocity detecting unit that detects a real velocity of the motor;

a velocity control unit that based on the real velocity and a target velocity calculates a motor driving command to cause the real velocity to follow up the target velocity; and a notch filter that attenuates a signal component at a central frequency from the motor driving command to obtain an attenuated input signal, and outputs the attenuated input signal based on which driving of the motor is controlled, wherein the central frequency is set equal to a frequency at which a phase of open loop frequency characteristics of the velocity control loop that does not include the notch filter is a value obtained by subtracting 180 degrees from a preset phase margin, and an attenuation factor of the notch filter by which the signal component at the central frequency is attenuated is set so that a gradient of a phase diagram of the open loop frequency characteristics of the velocity control loop including the notch filter is substantially zero at the central frequency.

2. A motor control apparatus that controls driving of a motor and includes a velocity control loop, wherein the velocity control loop includes a velocity detecting unit that detects a real velocity of the motor;

a velocity control unit that based on the real velocity and a target velocity calculates a motor driving command to cause the real velocity to follow up the target velocity; and a notch filter that attenuates a signal component at a central frequency from the motor driving command to obtain an attenuated input signal, and outputs the attenuated input signal based on which driving of the motor is controlled, wherein the central frequency is set equal to a frequency at which a phase of open loop frequency characteristics of the velocity control loop that does not include the notch filter is a value obtained by subtracting 180 degrees from a preset phase margin, and an attenuation factor of the notch filter by which the signal component at the central frequency is attenuated is set between −3 decibels and −6 decibels.

3. A motor control apparatus that controls driving of a motor and includes a velocity control loop, wherein the velocity control loop includes a velocity detecting unit that detects a real velocity of the motor;

a velocity control unit that based on the real velocity and a target velocity calculates a motor driving command to cause the real velocity to follow up the target velocity; and a notch filter that attenuates a signal component at a central frequency from the motor driving command to obtain an attenuated input signal, and outputs the attenuated input signal based on which driving of the motor is controlled, wherein the central frequency is 0.3 to 0.7 times a frequency at which a phase of open loop frequency characteristics of the velocity control loop that does not include the notch filter is −180 degrees, and an attenuation factor of the notch filter by which the signal component at the central frequency is attenuated is set between −3 decibels and −6 decibels.

4. A motor control apparatus that controls driving of a motor and includes a velocity control loop, wherein the velocity control loop includes a velocity detecting unit that detects a real velocity of the motor;

a velocity control unit that based on the real velocity and a target velocity calculates a motor driving command to cause the real velocity to follow up the target velocity; and a notch filter that attenuates a signal component at a central frequency from the motor driving command to obtain an attenuated input signal, and outputs the attenuated input signal based on which driving of the motor is controlled, wherein the motor control apparatus further comprises:

a phase-margin setting unit that sets a phase margin;

a gain-margin setting unit that sets a gain margin;

a frequency-characteristic acquiring unit that acquires open loop frequency characteristics of the velocity control loop that does not include the notch filter; and a parameter setting unit that sets the central frequency and an attenuation factor of the notch filter by which a signal component at the central frequency is attenuated, wherein the parameter setting unit sets the central frequency and the attenuation factor by which the signal component at the central frequency is attenuated to satisfy the phase margin set by the phase-margin setting unit and the gain margin set by the gain-margin setting unit, and so that a control gain of the velocity control unit is highest within a range within which the attenuation factor of the notch filter by which the signal component at the central frequency is attenuated is equal to or higher than −6 decibels, based on the velocity open loop frequency characteristics obtained by the frequency-characteristic acquiring unit.

* * * * *